(12) United States Patent
Subramanyan et al.

(10) Patent No.: US 7,953,893 B1
(45) Date of Patent: May 31, 2011

(54) METHOD AND SYSTEM FOR EXPEDITED HTTP COMMUNICATION

(75) Inventors: Badri Subramanyan, Overland Park, KS (US); Piyush Upadhyay, Mission, KS (US); Ayodeji Abidogun, Overland Park, KS (US); John W. Davis, Kansas City, MO (US); William J. Routt, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 12/061,977

(22) Filed: Apr. 3, 2008

(51) Int. Cl.
*G06F 15/16* (2006.01)
*G06F 15/173* (2006.01)

(52) U.S. Cl. ......... 709/246; 709/217; 709/223; 709/224

(58) Field of Classification Search .......... 709/223–224, 709/217, 246
See application file for complete search history.

(56) References Cited

U.S. PATENT DOCUMENTS

| | | | |
|---|---|---|---|
| 4,907,149 A | 3/1990 | Gula et al. | |
| 5,991,760 A | 11/1999 | Gauvin et al. | |
| 6,185,625 B1 * | 2/2001 | Tso et al. | 709/247 |
| 6,377,957 B1 | 4/2002 | Jeyaraman | |
| 6,469,723 B1 | 10/2002 | Gould et al. | |
| 6,606,604 B1 | 8/2003 | Dutta | |
| 6,785,707 B2 | 8/2004 | Teeple | |
| 6,941,310 B2 | 9/2005 | Ahad et al. | |
| 2005/0138138 A1 | 6/2005 | Jelinek et al. | |
| 2006/0122844 A1 | 6/2006 | Dangberg | |

OTHER PUBLICATIONS

U.S. Appl. No. 10/978,772, filed Nov. 1, 2004.

* cited by examiner

*Primary Examiner* — Hussein A Elchanti

(57) ABSTRACT

Disclosed herein is a method and system, in which a network entity determines that an HTTP response destined to a client station contains a markup document that references at least one object but that the HTTP response does not contain the object. In response, in addition to sending the HTTP response to the client station, the network entity will send to the client station a supplemental HTTP response that contains the object, without the client station sending a request for the object. By avoiding the need for the client station to send a request for the object, the extent of HTTP communication by the client station is reduced. In the situation where the client station is a wireless handset or other wireless communication device, the method is particularly advantageous, as the method can reduce the number of air interface communications and can thus help to conserve valuable air interface resources.

20 Claims, 4 Drawing Sheets

METHOD AND SYSTEM FOR EXPEDITED HTTP COMMUNICATION

BACKGROUND

It is well known today that a wireless handset such as a cell phone can be equipped with a web browser to support requesting, receiving and rendering of web content. Like PC-based browsers, a typical cell phone browser will use Hypertext Transport Protocol (HTTP) messaging or some variant of HTTP messaging (hereafter HTTP) to request and receive web content. For instance, the browser may send to a web server an HTTP GET request specifying desired content and may then receive from the web server an HTTP 200 OK request carrying the requested content.

In many cases, the content returned by the web server will comprise an HTML markup document or the like, which may include text, object-references, and formatting directives, among other elements. Each object-reference will typically point to an image file, music file, multimedia file (e.g., audio/video file) or other object at a particular location specified by a Universal Resource Indicator (URI). When the browser receives the markup document, the browser will then automatically respond to each such object reference by sending a respective secondary HTTP request or the like, in order to download the referenced object for presentation to a user. The browser will then present the text and objects in the manner indicated by the markup.

OVERVIEW

In general, each HTTP communication to or from a wireless handset consumes valuable air interface resources. For instance, if the handset is served by a cellular radio access network (RAN), the RAN may have a limited set of resources to support wireless communications with served devices. Examples of such limited resources include air interface encoding-resources (e.g., spreading resources, such as "Walsh codes"), air interface timeslots, air interface transmission power, among others.

Disclosed herein is a method that can help to reduce consumption of such valuable resources, by reducing the extent to which a wireless handset sends and receives HTTP communications. More generally, the method can apply in any situation where a client station (wireless or not) engages in HTTP communication to request content, and where the client station would normally receive a markup document referencing one or more objects and then responsively send one or more additional HTTP requests to download the referenced object(s).

According to the method, a network entity will determine that an HTTP response destined to a client station contains a markup document that references at least one object but that the HTTP response does not contain the object. In response, the network entity will send to the client station a supplemental HTTP response that contains the object, without the client station sending a request for the object. By avoiding the need for the client station to send a request for the object, the extent of HTTP communication by the client station is reduced. In the situation where the client station is a wireless handset or other wireless communication device, the method is particularly advantageous, as the method reduces the number of air interface communications and thus helps to conserve valuable air interface resources.

In one arrangement, the method is carried out by an intermediary, such as a switch, gateway, or proxy server, that sits in an HTTP communication path between the client station and a content server. In that arrangement, the client station's HTTP request would pass through the intermediary on its way from the client station to the content server, and the primary HTTP response carrying the markup document would pass through the intermediary on its way from the content server to the client station. The intermediary may thus detect that the primary HTTP response contains a markup document that references the object and perhaps further that the primary HTTP response does not contain the object. In response, the intermediary may then fetch the object (e.g., from data storage or by requesting it from the content server or another entity) and generate and transmit to the client station a supplemental HTTP response containing the object, without the need for the client station to send a request for the object.

In another arrangement, the method is carried out by the content server itself. In that arrangement, the content server sends both the primary HTTP response and the secondary HTTP response. That is, in response to the single HTTP request from the client station, the server sends to the client station both (i) an HTTP response that contains a markup document referencing an object and (ii) another HTTP response that contains the object.

Optimally, the client station will be programmed with logic to facilitate handling multiple substantive HTTP responses to a single HTTP request as described herein. For instance, the functionality could be provided in a new version of HTTP. In accordance with the new version, a browser on the client station may include in the HTTP request an indication that the browser (and thus the client station) is capable of handling multiple HTTP responses to a single HTTP request. The indication may comprise a header parameter, such as an HTTP version number, for instance. Upon receipt of the HTTP request, the network entity (e.g., intermediary or server) can thus determine from the indication that the client station is capable of handling multiple HTTP responses to a single HTTP request, and the network entity may therefore carry out the functions of fetching the referenced object and transmitting it to the client station in a supplemental HTTP response.

These and other aspects, advantages and alternatives will become apparent to those of ordinary skill in the art by reading the following detailed description with reference where appropriate to the accompanying drawings. Further, it should be understood that the description provided in this section and elsewhere in this document is intended to illustrate the present method and system by way of example only and without limitation, and therefore that numerous variations may now be possible or may be developed in the future and will fall within the scope of the appended claims.

DETAILED DESCRIPTION

Figure 1:
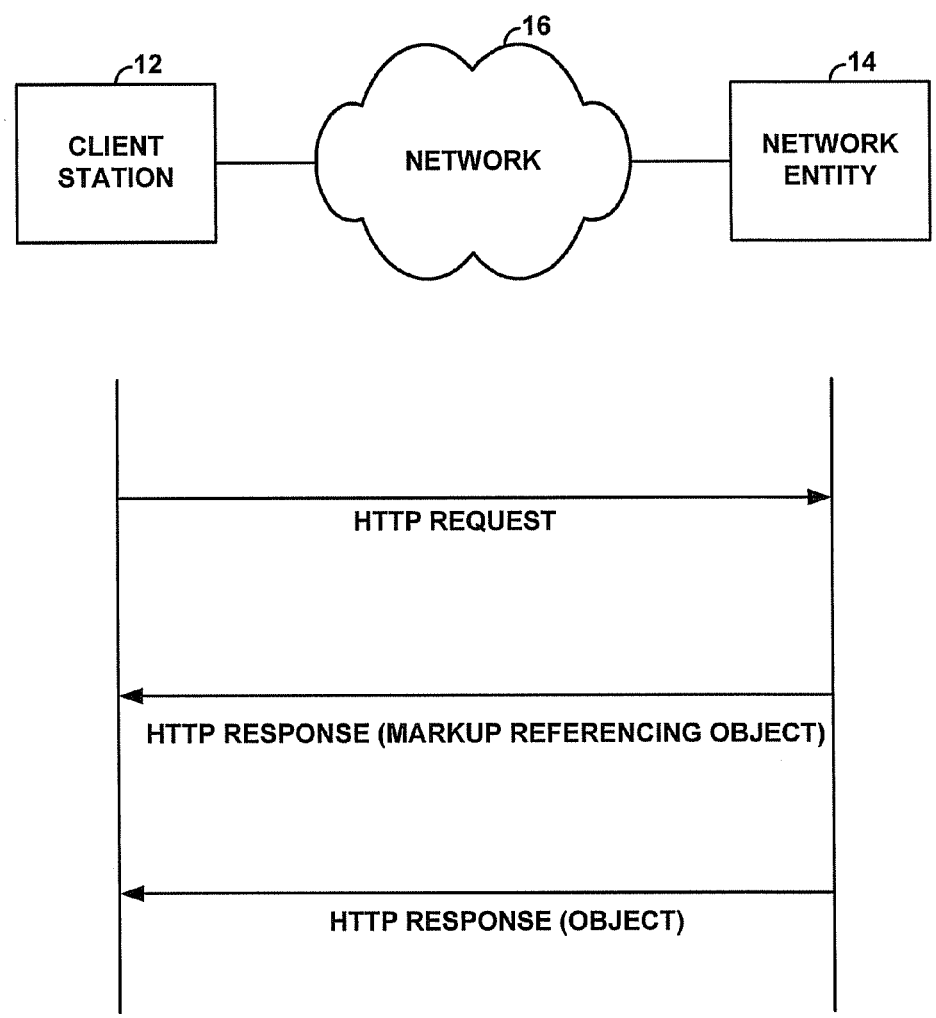
FIG. 1 is a simplified block diagram of a communication system in which the present method can be implemented, including a message flow depicting functions that can be implemented in accordance with the method.

Referring to the drawings, as noted above, FIG. 1 is a simplified block diagram of a communication system in which the present method can be implemented, together with a message flow depicting functions that can be implemented in the communication system.

As a general matter, the communication system includes a client station 12 and a network entity 14, which are arranged to communicate with each other via a network 16. The links shown coupling the client station 12 and the network entity 14 to the network 16 are depicted as single, solid lines, but it will be understood that those links can take any of a variety of forms, including one or more wired and/or wireless components and one or more intervening nodes and links. Likewise, although the network 16 is depicted as a single network cloud, the network may itself take various forms including perhaps a single direct link or perhaps multiple networks.

Client station 12 may be any type of client station, or more generally any type of communication device or system that functions to send and receive HTTP messages in accordance with the present method, regardless of whether the client station communicates wirelessly or through a landline connection. By way of example, client station 12 may be a wireless handset such as a cell phone or personal digital assistant (PDA), a personal computer, a network equipped appliance, or other device or system. Preferably, the client station will include a processor, data storage, and program logic stored in the data storage and executable by the processor to carry out the client station functions described herein. For instance, the client station will preferably be programmed with a browser application arranged to send and receive HTTP messages and specifically to handle receipt of multiple substantive HTTP responses to a single HTTP request as described herein.

Network entity 14 may likewise be any type of entity that functions to receive and send HTTP messages and carry out other functions in accordance with the present method, also regardless of whether the network entity 14 communicates wirelessly or through a landline connection. By way of example, as will be described more below, the network entity 14 may be a content server such as a web server, or the network entity may be an intermediary such as a switch, gateway, or proxy, that sits in an HTTP communication path between such a server and the client station. Preferably, the network entity will include a processor, data storage, and program logic stored in the data storage and executable by the processor to carry out the network entity functions described herein. For instance, the network entity will preferably be programmed to detect an HTTP response being sent to the client station, to identify an object referenced by but not included in the HTTP response, and to transmit that object to the client station in a supplemental HTTP response.

Now considering the message flow of FIG. 1, at step 20, the present method begins with client station 12 transmitting an HTTP request, which traverses network 16 and is received by network entity 14. At step 22, network entity 14 then transmits to client station 12, via network 16, a first HTTP response, which contains a markup document that references an object but does not contain the object. At step 24, network entity 14 will then transmit to the client station, via network 16, a second HTTP response, which contains the object.

Optimally, as shown, the network entity 14 will transmit the second HTTP response without the client station 12 having transmitted a second HTTP request and particularly without the client station 12 having transmitted an HTTP request seeking the object, which is contrary to normal current practice. To do this, client station 12 may hold open its TCP socket or other connection that the client station had opened for sending the HTTP request, notwithstanding the fact that the client has received a response (the first HTTP response) to the HTTP request. Further, the network entity 14 may read the markup document carried by the first HTTP response and identify the referenced object (e.g., by URI), and the network entity 14 may then fetch that object (e.g., from the network entity's own data storage if applicable, or from some other entity or storage). The network entity 14 may then generate and transmit to client station 12 the second HTTP response, containing the referenced object.

The markup document carried by the first HTTP response may comprise an XML document, such as an Hypertext Markup Language (HTML) document for instance or may take some other form. In turn, the referenced object may comprise an image file, an audio file, a video file, a text file, or any other type of object now known or later developed, with the reference to the object comprising a URI or other type of reference. For instance, the first HTTP response may carry an HTML document defining a web page, and the document may include an image reference that points to an image file at a particular URI, such that when a browser on the client device 12 obtains the referenced image, the browser can display the web page including the image.

In turn, the second HTTP message may carry the object in any of a variety of ways. For instance, the second HTTP message may carry the object using the well known Multipart Internet Mail Extensions (MIME) protocol or variants of that protocol, which may for instance carry the object in Base64 encoded founat. Alternatively, the second HTTP message may carry the object in a less encoded or unencoded format, or encoded in some other manner. The second HTTP message may itself include a markup document that references the object.

In practice, the present method can be implemented by programming client stations and network entities to carry out the method. In particular, the method can be implemented by programming client stations and network entities to comply with a new version of HTTP that embodies the method. A client station running a browser compliant with the new version of HTTP may then open a connection to facilitate transmission of its HTTP response and receipt of an HTTP response carrying a requested markup document, and the client station may then keep that connection open and await receipt of at least one more HTTP response carrying one or more objects referenced by the markup document carried by the first HTTP response. (Of course, the order of transmission of these HTTP responses can vary in a given scenario as well.) The client station may then render the markup document together with the received object(s) in much the same way that a client station today would render a markup document together with objects that the client station separately requests and receives.

It is envisioned that some client stations may comply with this new version of HTTP while others may not. In the situation where a network entity is arranged to carry out the present method but a given client station is not so arranged, a problem could arise as the network entity may attempt to send a second HTTP response to the client station but the client station would not be capable of receiving the second HTTP response without having sent an associated second HTTP request. In practice, what may happen in that scenario is that the second HTTP response may be transmitted to the client station (and thus possibly waste air interface resources if the client station is a wireless device), but the client station would not consider the second HTTP response. Rather, applying normal existing procedures, the client station would likely send a second HTTP request seeking an object referenced by the markup document received in the first HTTP response, and the client station would receive then receive a response to that second HTTP request, providing the client station with the request object.

To help avoid this waste of resources, a network entity carrying out the present method may be programmed further to determine whether the requesting client station is compliant with the present method, i.e., whether the client station is capable of receiving (and thus processing) multiple substantive HTTP responses to a single HTTP request, and to condition application of the method on that capability determination. To enable the network entity to make this determination, the client station may include in its HTTP request certain data that indicative of its compliance with the method.

By way of example, the client station can include in the request an indication of an HTTP version number for an HTTP version that embodies the method. Upon receipt of the HTTP request (or a message generated based on the HTTP request) that indicates that HTTP version number, the network entity may programmatically conclude that the client station is capable of handling multiple HTTP responses to a single HTTP request as in the present method. Therefore, the network entity may then generate and send at least a second HTTP response providing one or more objects referenced by a markup document carried by the first HTTP response.

As another example, the client station can include in the request data that identifies the client station, such as simply a source IP address of the client station, or some header parameter that identifies the client station. Upon receipt of the HTTP request (or a message generated based on the request), the network entity may then read that identification data and perform a database lookup (in a pre-populated device-capabilities database for instance) to determine whether the identified client station is capable of handling multiple HTTP responses to a single HTTP request as in the present method. If so, the network entity may then generate and send at least a second HTTP response providing one or more objects referenced by a markup document carried by the first HTTP response. Other examples of data or triggers for carrying out the present method may be developed as well.

Figure 2:
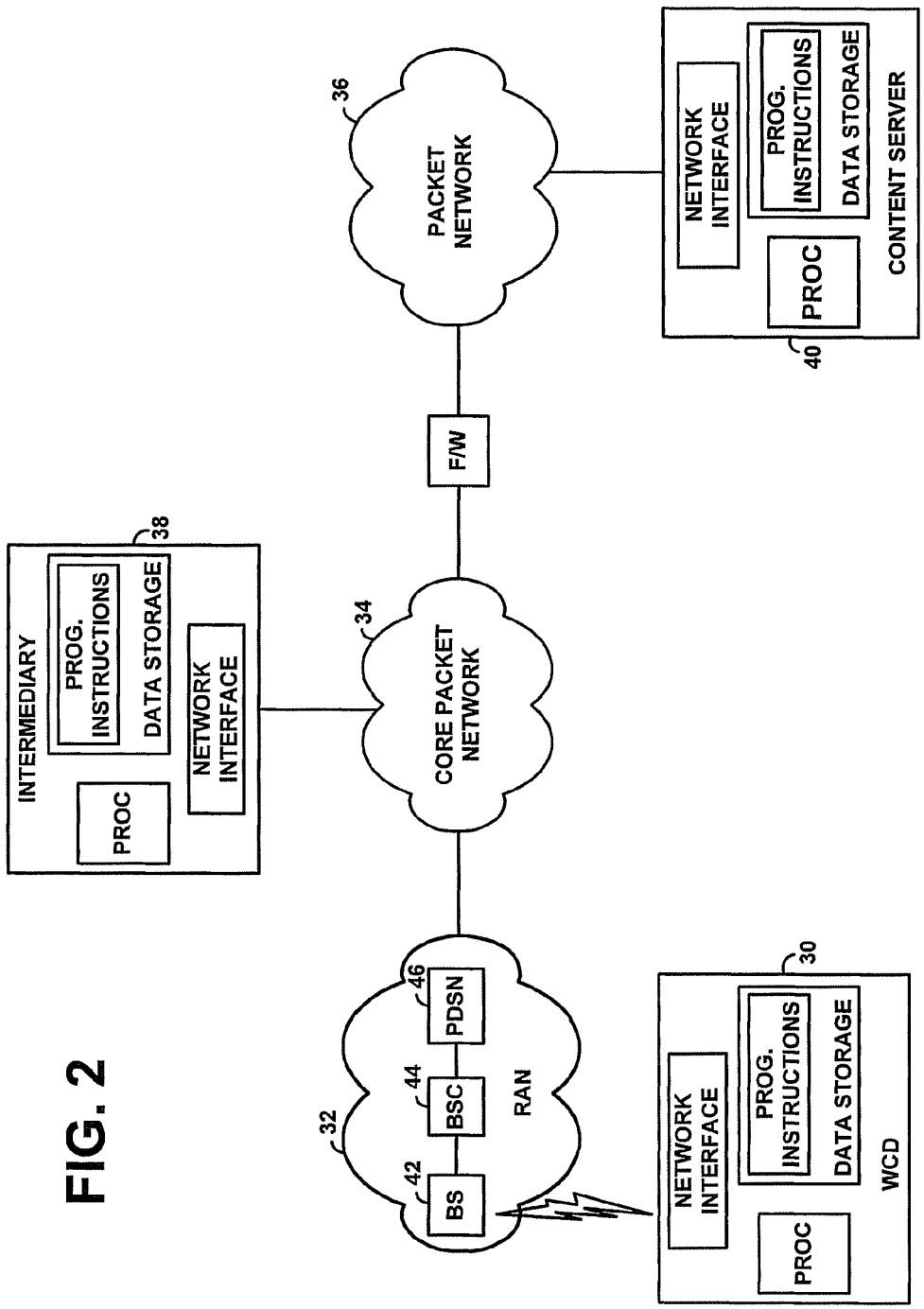
FIG. 2 is a more detailed, but still simplified, block diagram of a communication system in which the method can be implemented.

As noted above, the arrangement of FIG. 1 is a simplified block diagram of a communication system in which the present method can be implemented. As such, the arrangement of FIG. 1 is generally representative of numerous possible network arrangements. FIG. 2 depicts, by way of example, a more specific network arrangement in which the method can be implemented.

In FIG. 2, the client station is depicted as a wireless communication device (WCD) 30 such as a web-capable cell phone or PDA, preferably programmed with a web browser compliant with the present method. In turn, the network is depicted as a combination of a RAN 32, a wireless carrier's core packet-switched network 34, and another packet-switched network 36 such as the Internet for instance. In this arrangement, two examples of a network entity are shown. As one possibility, the network entity could be a gateway or other intermediary 38, which is shown for illustration sitting as a node on core network 34. As another possibility, the network entity could be a content server 40, such as a web server for instance, which is shown for illustration sitting as a node on network 36. It should be understood, first, that these are merely examples of network entities, and, second, that the illustrated positioning of the network entities is not intended to be limiting but is merely an example of possible positioning.

Also for illustration, the WCD and each network entity are each shown containing a network interface, a processor, data storage, and program instructions in the data storage. In the WCD and each network entity, these components can take various forms.

For example, the network interface in the WCD may comprise at least one cellular wireless chipset such as one made by Qualcomm for instance, and an antenna, to facilitate communication over an air interface with the RAN 32. The network interface in the intermediary, on the other hand, may comprise a network interface such as a wired or wireless Ethernet communication module that facilitates communication on core network 34, or may, for instance, comprise a network interface for communicating via core network 34 and RAN 32 with WCD 30 and another network interface for communicating via core network 34 and network 36 with content server 40. The network interface in the content server 40 may then likewise comprise one or more network interfaces such as a wired or wireless Ethernet communication module for communicating on network 36.

As another example, the processor in the WCD and each network entity may comprise one or more general purpose processors (e.g., INTEL or AMD processors) and/or one or more special purpose processors (e.g., digital signal processors). In turn, the data storage in the WCD and each network entity may comprise one or more volatile and/or non-volatile storage components, such as optical, magnetic, or organic storage, or other thin's of storage now known or later developed.

As shown, the data storage in the WCD and each network entity contains program instructions. The program instructions are preferably executable by the corresponding processor to carry out various functions described herein. For instance, the program instructions in the data storage of the WCD are preferably executable by the processor of the WCD to carry out the WCD functions described herein. Likewise, the program instructions in the data storage of each network entity are preferably executable by the processor of the network entity to carry out the network entity functions described herein. The data storage in the WCD and each network entity may of course contain other data as well. For instance, at times, the data storage may contain markup language and associated objects. As with other disclosure provided herein, variations on the arrangements shown are possible. Further, function described herein as carried out by a processor executing program instructions may instead be carried out by hardware or other logic.

RAN 32 generally functions to provide WCD with wireless connectivity to communicate with entities on other networks, such as with intermediary 38 and/or content server 40. As such, RAN 32 may take various forms, such as a simple wireless access point router or a more complex cellular radio access network.

As shown, for instance, an exemplary RAN may include a base station 42 comprising equipment and antennas designed to radiate so as to define one or more coverage areas (e.g., a cell site and cell sectors) in which WCD 30 and other client devices can communicate with the RAN. The RAN may communicate wirelessly with the WCD in accordance with any agreed air interface protocol, examples of which include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and others now known or later developed. Base station 42 is the coupled or integrated with a base station controller (BSC) 44, which is in turn coupled with a packet data serving node (PDSN) 46 that provides connectivity with the wireless carrier's core network 34. Core network 34 is then coupled through a firewall with network 36.

With this arrangement, if WCD 30 is suitably equipped, WCD 30 can acquire wireless packet-data connectivity so as to be able to engage in packet data communication with network entity 38 or 40, or with other entities on core network 34 or network 36. For instance, through well known procedures, WCD 30 may acquire a radio link layer connection with RAN 32, a data link layer connection with PDSN 46, and a network connection with core network 34, obtaining a mobile-IP address for example, to be able to engage in IP communication with one or more entities on core network 34 and network 36. With that capability, WCD 30 may thus engage in HTTP messaging over IP.

Intermediary 38 may take various forms and serve various purposes. As an example, the intermediary may be a wireless access protocol (WAP) gateway or other sort of gateway operated by the wireless carrier that operates RAN 30. As such, each WCD served by the RAN, including WCD 30, may be programmed to direct all or substantially all outbound packet traffic to the intermediary, for the intermediary to then forward to the intended destination of the traffic. For instance, if WCD 30 seeks to send an HTTP message to content server 40, the WCD 30 may send the HTTP message to intermediary 38, and intermediary 30 may then forward the HTTP message to the content server. Likewise, an HTTP message flowing from server 40 to WCD 30 may pass through the intermediary on its way. (Note that the intermediary may regenerate the message, or open a separate socket on its outbound side and send a new corresponding HTTP message. Further, the intermediary may modify an HTTP message in one way or another during transit. In either case, for purposes of this description, we can consider the intermediary to be forwarding the message, and we can disregard the fact that the message may be regenerated or modified in transit.)

As another example, intermediary 38 may comprise a switch, proxy server, web portal or other entity. Generally, these sorts of entities would operate in a similar manner, in that they could receive an HTTP message being transmitted between the WCD 30 and content server 40 and could forward the message along to its destination. Other examples are possible as well.

Content server 40 may likewise take various forms and serve various purposes. For example, content server 40 may be a web server arranged to serve web content to requesting client stations, such as WCD 30. As such, content server 40 may reside at a URI or IP address to which WCD 30 may direct an HTTP request, and content server 40 may receive such a request and respond by transmitting to the WCD an HTTP response carrying a markup document (and perhaps one or more referenced objects and other data). Furthermore, content server 40 may host one or more objects referenced by the markup document but not included in the HTTP response. Thus, in normal practice, upon receipt of the HTTP response from the content server, WCD 30 may send additional requests for the one or more referenced objects, and the content server may return those objects in response to the WCD. In an alternative arrangement, the referenced but not included objects may reside elsewhere, such as at another server.

Figure 3:
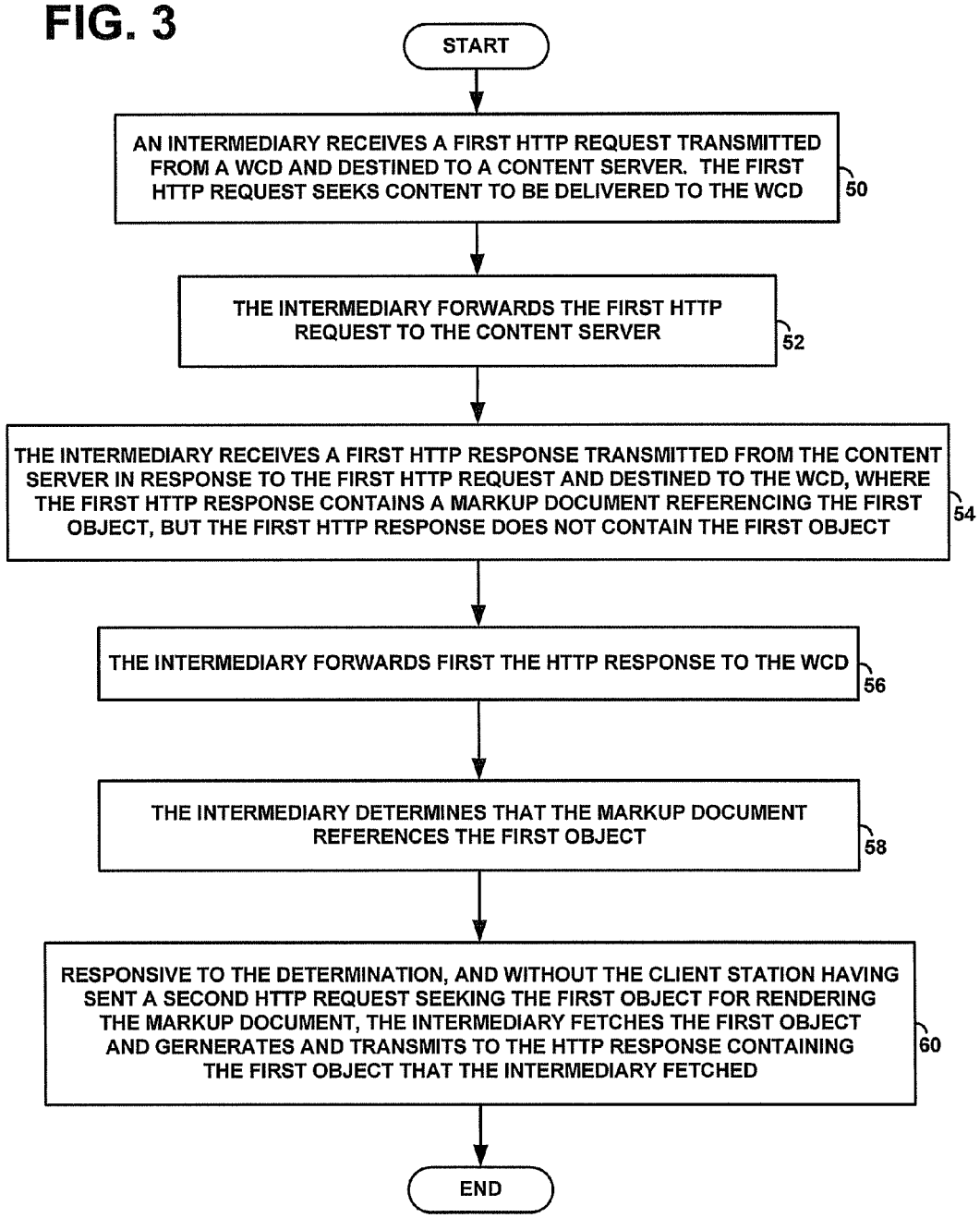
FIG. 3 is a flow chart depicting functions that can be implemented in accordance with the method.
Figure 4:
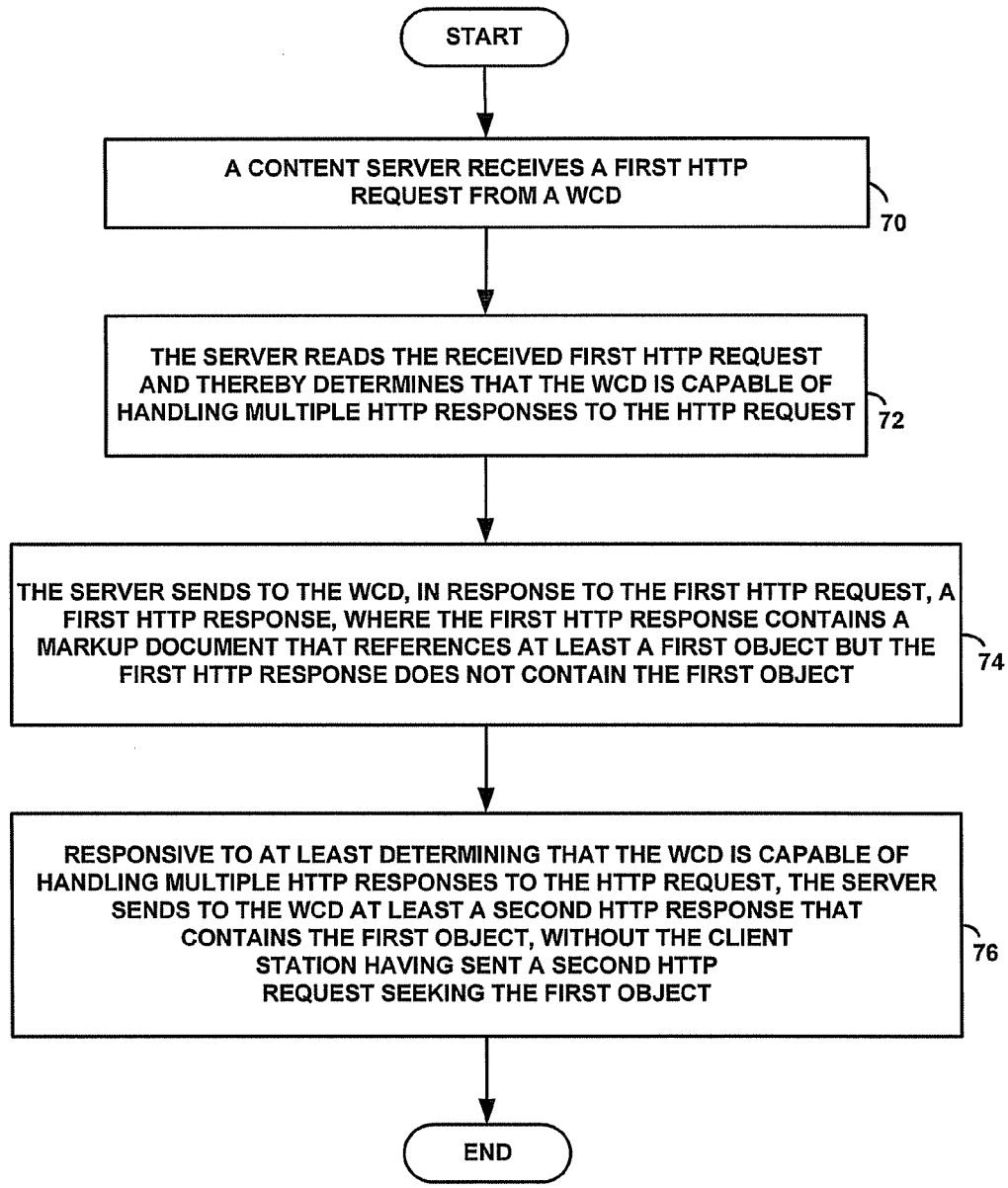
FIG. 4 is another flow chart depicting functions that can be implemented in accordance with the method.

FIGS. 3 and 4 are flow charts depicting example operation of the present method when carried out, respectively, at intermediary 38 and content server 40. It will be understood that variations from the flows shown are possible. For example, the order of steps may vary, and steps may be added, combined, removed, or otherwise modified.

Referring first to FIG. 3, the flow chart depicts example operation of the method at intermediary 38, to expedite HTTP communication. As shown in FIG. 3, at step 50, the intermediary receives a first HTTP request transmitted from the WCD 30 and destined to the content server 40, where the first HTTP request seeks content to be delivered to the WCD 30. At step 52, the intermediary then forwards the first HTTP request to the content server 40.

At step 54, the intermediary thereafter receives a first HTTP response transmitted from the content server in response to the first HTTP request and destined to the WCD 30, where the first HTTP response contains a markup document that references at least a first object but the first HTTP response does not contain the first object. At step 56, the intermediary then forwards the first HTTP response to the WCD 30.

At step 58, the intermediary determines that the markup document references the first object, such as by programmatically reading the markup document and detecting the object reference. Responsive to at least that determination, at step 60, the intermediary then fetches the first object and generates (e.g., originates or obtains) and transmits to the WCD, also in response to the first HTTP request, a second HTTP response containing the first object that the intermediary fetched. As further indicated, the function of step 60 occurs without the client station having sent a second HTTP request seeking the first object for rendering the markup document.

FIG. 3 shows steps 58 and 60 occurring after step 56. In practice, this can be done by having the intermediary cache a copy of the first HTTP response, to facilitate analysis and action after having transmitted the response to WCD 30. Alternatively, steps 58 and 60 (or perhaps just step 58) could take place before step 56, i.e., the intermediary could analyze the first HTTP response before sending the first HTTP response along its way to the WCD 30. Other variations are possible as well.

In the example method, as noted above, the first HTTP request could be an HTTP GET request, an HTTP POST request, or another HTTP request. In turn, the first HTTP response could be an HTTP 200 OK response or other 2xx series response, and the second HTTP response could also be an HTTP 200 OK response or other 2xx series response. Note that other HTTP messages could pass as well from the intermediary to the WCD (or more generally to the client station) in response to the first HTTP request message. For example, the intermediary could send a procedural HTTP message such as an HTTP 3xx series message, that does not contain the markup document or any object referenced by markup document.

Further, all but the last substantive HTTP response that the intenediary sends to the WCD in response to the first HTTP request could include a flag or other data indicating that at least one additional HTTP response is still to come. Alternatively or additionally, the last HTTP response sent in response to the first HTTP request could include a flag or other data indicating that it is the last HTTP response. The WCD may then fully render, or complete rendering, of the markup document as much as possible given the one or more provided objects. WCD 30 may thus be programmed to interpret each response accordingly. For instance, if an HTTP response is not the final response to the first HTTP request, then the WCD may keep its TCP socket or other connection open and await receipt of at least another HTTP response. And if the HTTP response is the final response to the first HTTP request, then the WCD may close its connection and render the content.

In an exemplary arrangement, for instance, the new version of HTTP that complies with the present method will define a new 2xx series code that recipient client stations such as WCD 30 can be programmed to interpret as indicating that, before the client station closes a connection associated with the first HTTP request, the client station should await receipt of at least a second HTTP response to the first HTTP request. Other arrangements are possible as well.

Although FIG. 3 depicts transmission of a single additional HTTP response in response to the first HTTP request, it should be understood that the process may involve transmitting any number of additional HTTP responses in response to the first HTTP request. For instance, the markup document could reference a second object and the first HTTP response could omit that second object. In that case, the method may further involve, responsive to determining that the markup document references at least one non-included object, the intermediary fetching the second object and generating and transmitting to the WCD, also in response to the first HTTP request, a third HTTP response containing the second object fetched by the intermediary. Further, it should be understood that a given supplemental HTTP response could provide more than one object referenced by the markup document.

As also noted above, the intermediary could use MIME to include the first object in the second HTTP response (and likewise to include other objects in the second or other HTTP responses). As such, the intermediary could include the first object in the second HTTP response using Base64 encoding. Alternatively, the intermediary could include the first object in the second HTTP response without Base64 encoding.

Furthermore, as also noted above, the intermediary could condition performance of the fetching, generating, and transmitting functions on a determination that the WCD or other client station is capable of handling multiple responses to the first HTTP request. For instance, as noted above, the first HTTP request could carry header data, such as an HTTP version number, indicating that the WCD is capable of handling multiple responses to the first HTTP request.

Referring next to FIG. 4, the flow chart depicts example operation of the method at content server 40 or for that matter at another network entity, also to expedite HTTP communication. As shown in FIG. 4, at step 70, server 40 receives a first HTTP request from WCD 30. At step 72, the server then reads the received first HTTP request and thereby determine that the WCD 30 is capable of handling multiple HTTP responses to the HTTP request. At step 74, the server then sends to the WCD, in response to the first HTTP request, a first HTTP response, where the first HTTP response contains a markup document that references at least a first object but the first HTTP response does not contain the first object. Further, at step 76, responsive to at least determining that the WCD 30 is capable of handling multiple HTTP responses to the HTTP request, the server sends to the WCD at least a second HTTP response that contains the first object, without the client station having sent a second HTTP request seeking the first object.

It should be understood that the various aspects and specifics discussed above with respect to the method of FIG. 3 could be applied as well to the method of FIG. 4. Further, numerous other variations may be possible as well.

More generally, an exemplary embodiment has been described above. However, those of ordinary skill in the art will appreciate that various modifications may be made while remaining within the scope of the appended claims, including all equivalents.

We claim:

1. A method of expedited hypertext transport protocol (HTTP) communication comprising:
   at an intermediary in a communication path between a client station and a content server, receiving a first HTTP request transmitted from the client station and destined to the content server, and forwarding the first HTTP request from the intermediary to the content server, wherein the first HTTP request seeks content to be delivered to the client station;

thereafter receiving at the intermediary a first HTTP response transmitted from the content server in response to the first HTTP request and destined to the client station, and forwarding the first HTTP response from the intermediary to the client station, wherein the first HTTP response contains a markup document that references at least a first object but the first HTTP response does not contain the first object; and the intermediary determining that the markup document references the first object, and, responsive to at least the determining, the intermediary automatically (i) fetching the first object, and (ii) generating and transmitting to the client station, also in response to the first HTTP request, a second HTTP response containing the first object fetched by the intermediary, without the client station sending a second HTTP request seeking the first object.

2. The method of claim 1, wherein the first HTTP request is an HTTP GET request.

3. The method of claim 2, wherein the first HTTP response is an HTTP 200 OK response, and wherein the second HTTP response is also an HTTP 200 OK response.

4. The method of claim 2, further comprising the intermediary sending to the client station at least one procedural HTTP message in response to the first HTTP request, the at least one procedural HTTP message not containing the markup document or any object referenced by the markup document.

5. The method of claim 4, wherein the at least one procedural HTTP message comprises an HTTP 3xx message.

6. The method of claim 1, wherein the first HTTP response is an HTTP 2xx message that the client station is programmed to interpret as indicating that, before the client station closes a connection associated with the first HTTP request, the client station should await receipt of at least the second HTTP response.

7. The method of claim 6, wherein the connection comprises a TCP socket.

8. The method of claim 6, wherein the HTTP 2xx message has a series code that the client station is programmed to interpret as indicating that, before the client station closes a connection associated with the first HTTP request, the client station should await receipt of at least the second HTTP response.

9. The method of claim 1, further comprising provisioning the client station with a browser application executable by a processor of the client station to interpret the first HTTP response as indicating that, before the client station closes a connection associated with the first HTTP request, the client station should await receipt of at least the second HTTP response.

10. The method of claim 1, wherein the communication path includes an air interface between the intermediary and the client station, wherein the first HTTP request traverses the air interface, the first HTTP response traverses the air interface, and the second HTTP response traverses the air interface.

11. The method of claim 1, wherein the markup document further references a second object but the first HTTP response message does not contain the second object, the method further comprising:
   responsive to at least the determining, the intermediary automatically (i) fetching the second object, and (ii) generating and transmitting to the client station, also in response to the first HTTP request, a third HTTP response containing the second object fetched by the intermediary.

12. The method of claim 1, further comprising the intermediary using Multipurpose Internet Mail Media Extensions (MIME) to include the first object in the second HTTP response.

13. The method of claim 1, where the intermediary includes the first object in the second HTTP response without Base64 encoding.

14. The method of claim 1, wherein the first object comprises an image object.

15. The method of claim 1, further comprising the intermediary conditioning performance of the fetching, generating, and transmitting on a determination that the client station is capable of handling multiple responses to the first HTTP request.

16. The method of claim 15, wherein the first HTTP request carries header data indicating that the client station is capable of handling multiple responses to the first HTTP request.

17. The method of claim 16, wherein the data comprises a specification of an HTTP version number.

18. An intermediary situated in a communication path between a client station and a content server, wherein the communication path traverses an air interface between the intermediary and the client station, the intermediary comprising:

- at least one a network interface for receiving and sending communications along the communication path;
- at least one processor;
- data storage; and
- program logic stored in the data storage and executable by the at least one processor to carry out functions including:
  - (a) receiving via the at least one network interface a first HTTP request transmitted from the client station and destined to the content server, and forwarding the first HTTP request via the at least one network interface to the content server, wherein the first HTTP request seeks content to be delivered to the client station,
  - (b) thereafter receiving via the at least one network interface a first HTTP response transmitted from the content server in response to the first HTTP request and destined to the client station, and forwarding via the at least one network interface the first HTTP response to the client station, wherein the first HTTP response contains a markup document that references at least a first object but the first HTTP response does not contain the first object, and
  - (c) determining that the markup document references the first object, and, responsive to at least the determining, automatically (i) fetching the first object, and (ii) generating and transmitting to the client station via the at least one network interface, also in response to the first HTTP request, a second HTTP response containing the fetched first object, without the client station sending a second HTTP request seeking the first object.

19. The intermediary of claim 18, comprising a gateway operated by a wireless service provider, wherein the wireless service provider also operates radio access network infrastructure engaging in air interface communication with the client station.

20. The intermediary of claim 18, wherein the program logic is further executable by the at least one processor to condition performance of the fetching, generating, and transmitting functions on a determination by the program logic that the client station is capable of handling multiple responses to the first HTTP request, wherein the determination is made by reference to a header parameter in the first HTTP request.

* * * * *